Jan. 2, 1923.
P. J. SIMMEN.
AUTOMATIC SPEED CONTROL FOR RAILWAYS.
FILED AUG. 9, 1915.
1,440,415
2 SHEETS-SHEET 1
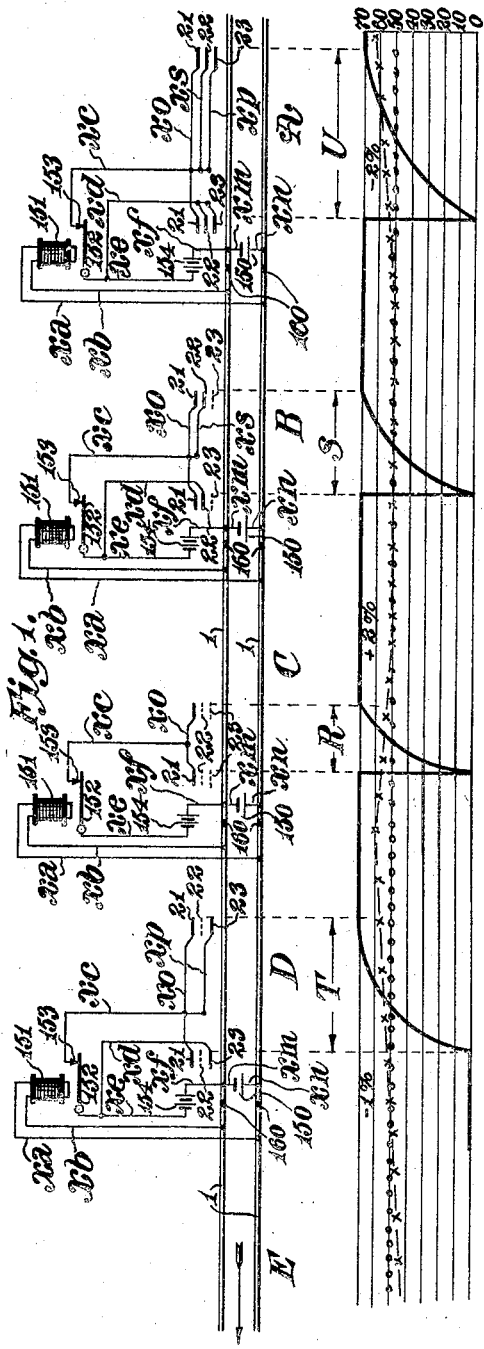
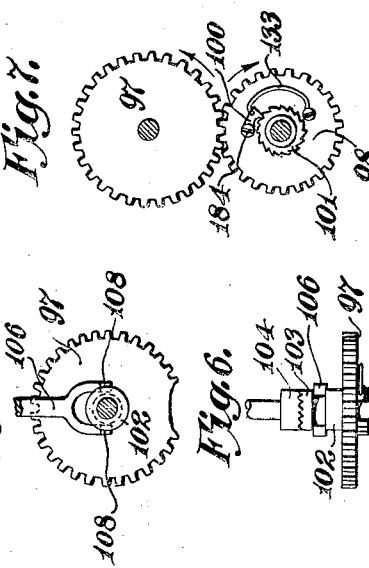
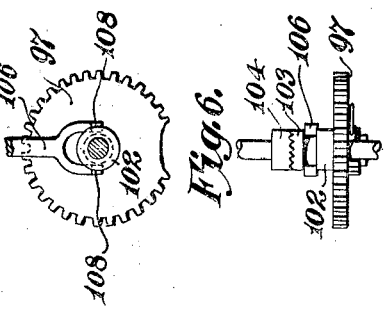
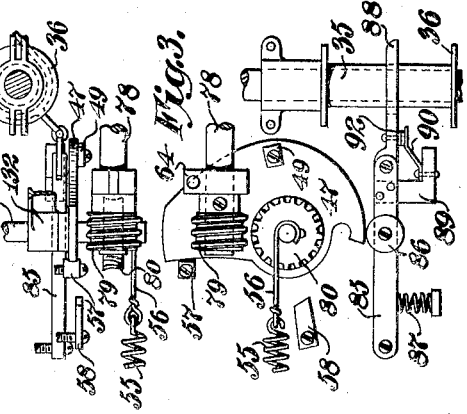
Paul John Simmen Inventor:
by William R. Baird
his Atty

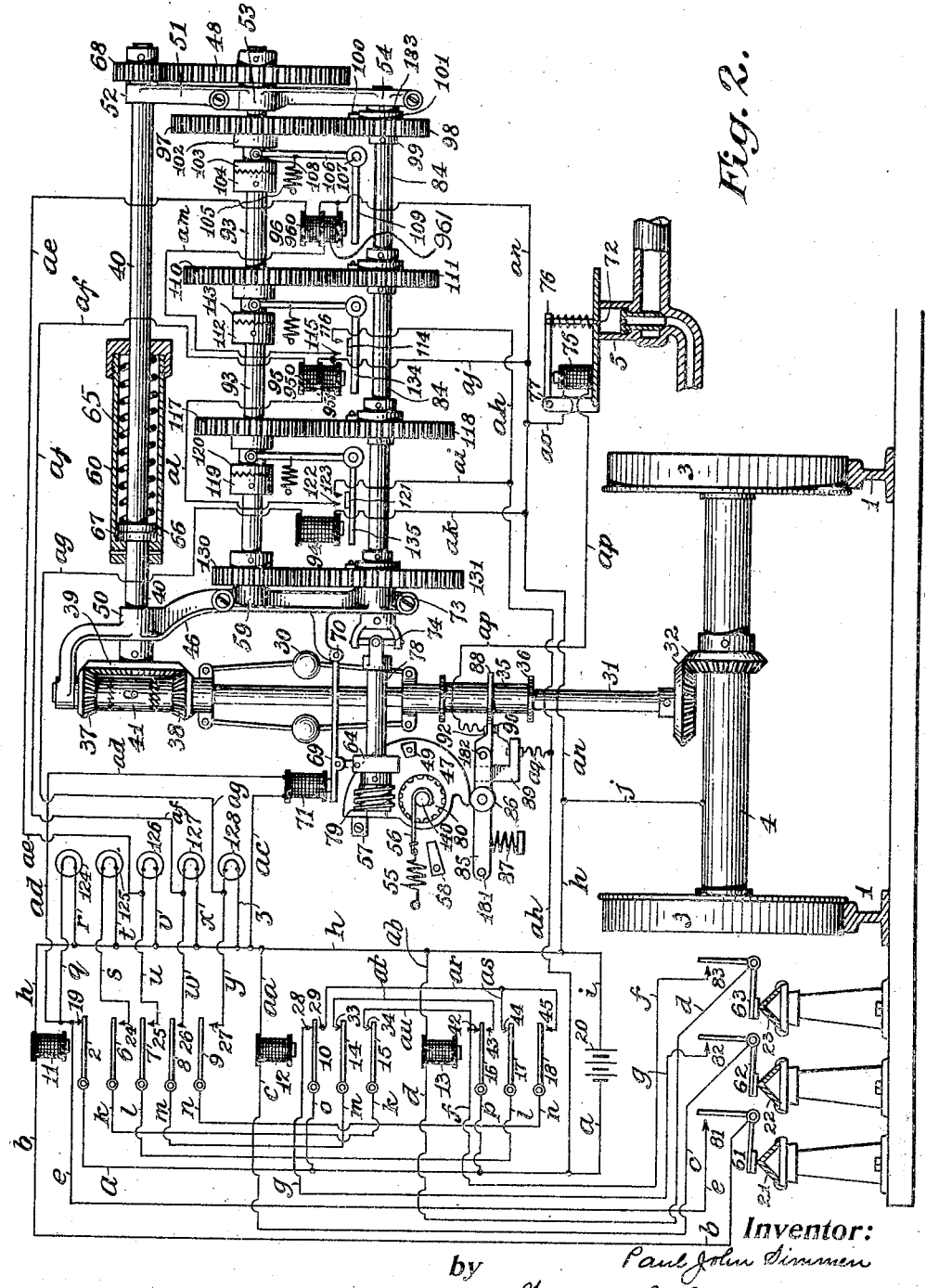

Patented Jan. 2, 1923.

1,440,415

UNITED STATES PATENT OFFICE.

PAUL JOHN SIMMEN, OF BUFFALO, NEW YORK.

AUTOMATIC SPEED CONTROL FOR RAILWAYS.

Application filed August 9, 1915. Serial No. 44,533.

*To all whom it may concern:*

Be it known that I, PAUL JOHN SIMMEN, a citizen of the United States, residing at Buffalo, in the county of Erie and State of New York, have invented certain new and useful Improvements in Automatic Speed Controls for Railways, of which the following is a specification.

This invention relates to an apparatus for automatically controlling the speed of a vehicle moving along a railway, and its novelty consists in the construction and adaptation of the parts as will be more fully hereinafter pointed out.

In Letters Patent of the United States, No. 1,150,308, dated August 17, 1915, and in Letters Patent, No. 1,150,309, dated August 17, 1915, I have described an automatic apparatus for controlling the speed of a moving vehicle, which in brief comprises a device moving in accordance with the actual speed of the vehicle, another device moving in accordance with a permissible speed therefor, together with means whereby, when the actual speed exceeds the permissible speed at any time, retarding mechanism with which the vehicle is equipped, is set into operation to reduce its speed or ultimately to stop the vehicle. The device moving in accordance with a permissible speed is so actuated that in moving from maximum speed to minimum speed a speed distance curve is generated which corresponds to the well known braking curve derived from experimental data.

The subject matter of the present application is specifically to provide means for bringing the permissible speed device from its maximum position to its minimum position in different distances, the selection of the specific distance in each case being made by elements along the trackway. The placing of these elements is determined by the permanent hazards along the trackway, such as grades, curves, etc., which would tend to vary the distance within which it is possible for a train to be brought to a stop.

In the drawings there is illustrated a preferred form of apparatus embodying my invention, the parts being shown largely in diagram for the sake of promoting clearness in the description, and the position of the parts being those assumed when a clear signal has been indicated on the vehicle, and the permissive indicating shaft and cam have been brought to a maximum position. For purposes of clearness, I have shown three relays, three contact shoes, and three signal rails, which provide four different braking distances. It will be clear, however, to anyone skilled in the art that wide variations may be made in the number of such elements and in the details of the apparatus without departing from the principles governing the invention.

In the drawings, Figure 1 shows in diagram a trackway, divided into four blocks for actuating devices carried on the vehicle; Figure 2 shows partly in diagram the devices as carried; Figure 3 is an enlarged detail of the permissible speed indicating cam; Figure 4 is a top plan view of the parts shown in Figure 3; Figure 5 is a side view of one of the gears; Figure 6 is a top view of the parts shown in Figure 5; and Figure 7 is a side elevation of one of the driving gears, its driven gear and coupling to the shaft of the latter.

In the drawings, 1, 1 indicate the track rails along which the vehicle is adapted to travel. These track rails are divided by insulated joints 160 into blocks A, B, C and D. At one end of each of these blocks is a track battery 150, connected to the track rails by wires $xm$ and $xn$. At the other end of each block is a track relay 151 connected to the track rails 1, 1 by wires $xa$ and $xb$. Adjacent to the entrance of each block are placed main home and distant signal rails 21, together with different combinations of auxiliary home and distant rails 22 and 23. The combination of signal rails which is to be used, is determined by the braking distance desired, as will be hereinafter explained. The energization or deenergization of the home and distant signal rails 21 and the distant signal rails 22 and 23 is controlled by means of the track relay 151 through a circuit which includes a battery 154, which is connected to the track rails 1, 1 by means of the wire $xf$, and which circuit is from the positive side of the battery 154 to the wire $xe$, armature 152, contact 153, wires $xc$, $xo$, $xs$ and $xp$, to the signal rails 21, 22 and 23 respectively. The home rails 22 and 23 are permanently energized from the battery 154 through a circuit from the positive side of the battery 154 to the wires $xe$ and $xd$ and home rails 22 and 23. The signal rails 22 are nearer to the gauge line of the track than the main signal rails 21, and the signal rails 23 are nearer to the gauge line of track than the signal rails 22.

In Figure 2, 1, 1 indicate the track rails as before. 3, 3 are the wheels of the vehicle, 4 is its axle, and the ordinary train pipe air valve controlling the brake system is generally indicated at 5. 61, 62 and 63 are shoes hingedly mounted at a convenient place on the vehicle and adapted to contact with the signal rails 21, 22 and 23 respectively. During such contact with a signal rail, the different shoes break contact with contact points 81, 82 or 83, and after leaving a signal rail are restored by gravity or spring pressure to their respective contact points. 11 is the main signal relay arranged at any convenient place on the vehicle, and 12 and 13 are auxiliary signal relays also on the vehicle, these relays being connected with the shoes 61, 62 and 63 respectively. The relay 11 has five neutral armatures 2, 6, 7, 8 and 9. When the relay is energized the armature 2 touches a contact 19, and when the relay is deenergized, the armatures 6, 7, 8 and 9 touch contacts 24, 25, 26 and 27 respectively. The relay 12 has three neutral armatures 10, 14 and 15, which when the relay is energized touch contacts 28, 33 and 34 respectively, and when the relay is deenergized the armature 10 touches a contact 29. The relay 13 has three neutral armatures 16, 17 and 18 and when it is energized armatures 16 and 17 touch contacts 42 and 44 respectively, and when it is deenergized the armature 16 touches a contact 43 and the armature 18 touches a contact 45. 20 is a local battery mounted on the vehicle. 124 is a clear signal or green light or maximum speed indicator and 125, 126, 127 and 128 are danger signals or red lights or minimum speed indicators, which are distinguished from each other by having particular braking distance displayed upon their surfaces.

Also mounted on the vehicle is a centrifugal governor 30 moved from a shaft 31 by gears 32 on the wheel axle 4. On its ball frame is a sleeve 35 slidable on the shaft 31 and provided with an annular flange 36. At its upper end the shaft 31 is provided with gears 37 and 38, each adapted to mesh with one gear 39 mounted on a shaft 40. Between the gears 37 and 38 is a sleeve 41 slidable on the shaft 31 and indented at both ends to engage similarly indented annular flanges on the gears 37 and 38, but which indentations run in opposite directions, whereby the shaft 40 is always rotated in the same direction, no matter in which direction the shaft 31 is rotated.

The shaft 40 is mounted in suitable bearings, viz. 50 contained in a bracket 46, and 52 contained in a bracket 51. It is provided at one end with the gear 39 and at the other end with the pinion 68, also with a power transmitting mechanism including a friction clutch indicated at 60 comprising two discs 67 and 66 pressed together by a spring 65 and so arranged that they slip when undue torsional strain is brought upon the shaft. Another shaft 93 is supported in suitable bearings 59 in the bracket 46, and 53 in the bracket 51, and is provided on one end with a gear 48 adapted to mesh with the pinion 68. The shaft 93 also carries a series of gears 97, 110, 117 and 130 which progressively decrease in size from right to left, and which are adapted to mesh permanently with a series of gears 98, 111, 118 and 131 respectively carried on a shaft 84 supported in bearings in the brackets 46 and 51, and which gears progressively increase in size from right to left. As each pair of these gears have similar devices attached thereto, it will only be necessary to describe one pair, for instance 97 and 98.

The gear 97 is mounted rotatably and slidably upon the shaft 93 and made integral with it or rigidly attached to it is a collar 102, the other end of which is rigidly secured to one member of a clutch 103, the other member 104 of which is rigidly attached to the shaft 93. A groove is formed on the collar 102 and is engaged by rollers 108 carried by the forked end of a bell crank lever 106 adapted to swing on a pivot 107 and the other end 109 of which lever constitutes the armature of an electromagnet 96 having coils 960 and 961. When this magnet is energized the arm 109 of the lever is attracted towards it and the collar 102 is thereby moved and the two members of the clutch 103—104 are moved out of mesh. A tension spring 105 is adapted to restore the lever 106 to its normal position when the magnet 96 is deenergized, and to put the clutch in mesh. When the teeth of the clutch 103—104 are out of mesh, the gear 97 remains in mesh with the gear 98 because the parts are so proportioned that the movement of the lever 106 does not disengage them.

The gear 98 is rotatably mounted on the shaft 84, but is prevented from sliding by collars 99 and 183, rigidly attached to the shaft. Attached to the collar 183 is a ratchet disc 101, which is adjacent to the gear 98, and is adapted to be moved by a pawl 100 pivotally mounted on the gear 98 at point 184, the engagement between them being promoted by a spring 133.

The gear 110 is coupled to its shaft through the clutch 112—113, which is opened by a bell crank lever one arm of which 134 is the armature of an electromagnet 95 provided with two coils 950 and 951. The arm 134 has attached thereto and insulated therefrom a contact member 114, which is adapted, when the magnet 95 is energized, to touch contact points 115 and 116. The gear 117 is coupled to its shaft through a clutch 119—120 which in turn is actuated by a bell crank lever one arm of which is an armature 135 of an electromagnet 94 and which arm has attached thereto and insulated therefrom a contact member 121, adapted, when the magnet 94 is energized, to touch contacts 122 and 123. Gear 130 is rigidly attached to the shaft 93. The gears 98, 111 and 118 all have collars, ratchets and pawls and springs similar to those described in connection with the gear 98. In the case of the gear 131 the bracket 46 takes the place of one of the collars.

The ratio of the gears 117 and 118 is greater than that of the gears 130 and 131, the ratio of the gears 110 and 111 is greater than that of the gears 117 and 118, and the ratio of the gears 97 and 98 is greater than that of the gears 110 and 111. The shaft 84 will be driven from the shaft 93 at a speed determined by the ratio of that pair of gears of the highest ratio, whose clutch is in mesh. For example, if the clutch 103—104 is out of mesh and the clutches 112—113 and 119—120 are in mesh, the speed of the shaft 84 will be decided by the ratio of gears 110 and 111. In such case, the gears 97 and 98 would not be revolving, but the gear 118 would be revolving at a slower rate than the shaft 84, the difference in their speeds being accounted for by the slipping of the pawl on its ratchet. In the same way, the gear 131 would be revolving slower than the shaft 84, but still slower than gear 118.

On one end of shaft 84 is attached one part of a universal joint 74, the other part being attached to a shaft 78 adapted to rotate in a bearing 64, suspended from an arm 69, which is the armature of an electromagnet 71, and is hinged on a pivot 70. The shaft 78 carries a worm 79 adapted to mesh with a worm gear 80 when the magnet 71 is deenergized and the arm 69 drops. Mounted in suitable bearings 132 is a shaft 140 which carries a speed control cam 47, and also the worm gear 80. A cord 56 and tension spring 55 tend to return the shaft 140 to its original position after rotation and release. A detent 58 is adapted to cooperate with a stop 49 mounted on the cam 47 to limit the movement of the cam beyond a minimum position and a detent 57 limits its movement beyond a maximum position.

It is evident that when the shaft 84 is driven through the gears 130 and 131, that the cam 47 will be moved from its maximum to its minimum position due to the movement of the vehicle through some definite distance, which may be designated as U. When however the gears 117 and 118 are driving the shaft, the cam 47 will be brought from its maximum to its minimum position due to the movement of the vehicle through another definite distance T, which is shorter than the distance U. When the gears 110 and 111 are driving the shaft, the cam 47 will be brought from its maximum to its minimum position due to the movement of the vehicle through a third distance S, which is shorter than the distance T and when the gears 97 and 98 are driving the shaft, the cam 47 will be brought from its maximum to its minimum position in another distance R, which is shorter than the distance S.

Adjacent to the train air pipe valve indicated at 5, is a magnet 75 having an armature 76 pivoted at 77 and adapted to compress a spring normally adapted to hold open the valve 5, which is a valve such as is well known in the art for permitting the air in the train line to exhaust to the atmosphere and thus apply the brakes when coil 75 is deenergized.

Hingedly mounted at 181 near the cam 47 is an arm 85 carrying a roller 86 and adapted to contact therewith, a compression spring 87 serving to promote such contact. The arm is provided with a pivot fork 88 hinged at 182 and adapted to straddle the collar 35, but to contact with the flange 36 on the sliding collar of the governor. To the arm 85 is fixed a supplemental arm 89 made of insulating material and carrying a contact 90 adapted to touch a similar contact member 92 carried by the arm 85.

The described parts are connected together by electrical conductors or wires, which are designated by the lower case letters of the alphabet, and will be so referred to as the operation of the apparatus is described.

Let it be assumed that a signal rail 21 is energized and that the shoe 61 has been moved into contact therewith and has been lifted to break the connection between the shoe and the contact 81. The relay 11 then becomes energized through a circuit from the positive side of the battery 154 to the wire $xe$, armature 152, contact 153, wires $xe$ and $xo$, signal rail 21, shoe 61, wire $b$, relay coil 11, wires $h$ and $i$, axle 4, rails 1, 1, wire $xf$ to the negative side of the battery 154. The energization of the relay 11 causes the green light 124 to glow through a circuit from the positive side of the battery 20 to the wire $a$, armature 2, contact 19, wire $q$, green light 124, wires $r$, $h$ and $i$ to the negative side of the battery.

Upon leaving the signal rail 21, the relay 11 remains energized through a holding circuit from the positive side of the battery 20 to the wire $a$, armature 2, contact 19, wire $e$, contact 81, shoe 61, wire $b$, relay coil 11 and wires $h$ and $i$ to the negative side of the battery 20. If the signal rail 21 is deenergized the relay 11 will become deenergized, its holding circuit being broken at the contact 81, and after leaving the signal rail, the relay 11 will remain deenergized as its holding circuit is then broken at the contact 19.

Now let it be assumed that an auxiliary signal rail 22 is energized, and that the shoe 62 has been moved into contact therewith and has been lifted to break the connection between the shoe and its contact 82. The relay 12 then becomes energized through a circuit from the positive side of the battery 154 to the wire $we$, armature 152, contact 153, wires $wc$, $ws$, signal rail 22, shoe 62, wire $c$, relay coil 12, wires $aa$, $h$ and $j$, axle 4, rails 1, 1 and wire $wf$ to the negative side of the battery 154.

Upon leaving the signal rail 22 the relay 12 remains energized through a holding circuit from the positive side of the battery 20 to the wires $a$ and $o$, armature 10, contact 28, wire $g$, contact 82, shoe 62, wire $c$, relay coil 12 and wires $aa$, $h$ and $i$ to the negative side of the battery 20. If the auxiliary signal rail 22 is deenergized, the holding circuit for relay 12 will be broken at the contact 82, and upon leaving the signal rail the relay 12 will remain deenergized as its holding circuit is then broken at the contact 28.

Now let it be assumed that a signal rail 23 is energized, and that the shoe 63 has been moved into contact therewith and has been lifted to break the connection between the shoe and the contact 83. The relay 13 is then energized through a circuit from the positive side of the battery 154 to the wire $we$, armature 152, contact 153, wires $wc$ and $wp$, signal rail 23, shoe 63, wire $d$, relay coil 13, wires $ab$, $h$ and $j$, axle 4, rails 1, 1 and wire $wf$ to the negative side of the battery 154.

Upon leaving the signal rail 23, the relay 13 remains energized through a holding circuit from the positive side of the battery 20, to the wires $a$ and $p$, armature 16, contact 42, wire $f$, contact 83, shoe 63, wire $d$, relay coil 13, wires $ab$, $h$ and $i$ to the negative side of the battery 20. If the auxiliary signal rail 23 is deenergized, the holding circuit for the relay 13 will be broken at the contact 83, and after leaving the signal rail 23 the relay 13 will remain deenergized, as its holding circuit is then broken at the contact 42.

Whenever the relay 11 is energized, the green light 124 is glowing as previously described. The coil 71 is also energized through a circuit from the positive side of the battery 20 to the wire $a$, armature 2, contact 19, wire $ad$, coil 71, wires $ac$, $h$ and $i$ to the negative side of the battery 20. The magnets 94, 95 and 96 are then all deenergized. These conditions exist irrespective of the condition of the relays 12 and 13. When relay 11 is deenergized varying conditions exist depending on the condition of the relays 12 and 13, as follows:

When relay 11 is deenergized and relays 12 and 13 are energized, the coil 71 is deenergized. The light 125 then glows through a circuit from the positive side of the battery 20 to the wires $a$ and $p$, armature 16, contact 42, wire $au$, contact 34, armature 15, wire $k$, armature 6, contact 24, wire $s$, light 125, wires $t$, $h$ and $i$ to the negative side of the battery 20 and the magnets 94, 95 and 96 are all deenergized.

When the relays 11 and 12 are deenergized, and the relay 13 is energized, coil 71 will also be deenergized. The light 126 then glows through a circuit from the positive side of the battery 20 to the wires $a$ and $o$, armature 10, contact 29, wires $ar$ and $as$, contact 44, armature 17, wire $l$, armature 7, contact 25, wire $u$, light 126, wires $v$, $h$ and $i$ to the negative side of the battery 20. The magnet 96 will be energized by its coil 960 through a circuit from the positive side of the battery 20 to the wires $a$ and $o$, armature 10, contact 29, wires $ar$ and $as$, contact 44, armature 17, wire $l$, armature 7, contact 25, wires $u$ and $ae$, coil 960, wires $an$, $h$ and $i$ to the negative side of the battery 20 and the magnets 94, and 95 are deenergized.

When the relay coils 11 and 13 are deenergized, and the relay coil 12 is energized, the magnet 71 will also be deenergized. The light 127 will then glow through a circuit from the positive side of the battery 20 to the wire $a$, wire $p$, armature 16, contact 43, wire $at$, contact 33, armature 14, wire $m$, armature 8, contact 26, wire $w$, light 127, wires $x$ and $h$ and $i$ to the negative side of the battery 20. The magnet 95 will be energized through its coil 950 through a circuit from the positive side of the battery 20 to the wires $a$ and $p$, armature 16, contact 43, wire $at$, contact 33, armature 14, wire $m$, armature 8, contact 26, wires $w$, and $af$, coil 950, wires $aj$, $an$, $h$ and $i$ to the negative side of the battery 20. The magnet 96 will also be energized through its coil 961, through a circuit from the positive side of the battery 20, to the wires $a$ and $ah$, contact 116, contact member 114, contact 115, wire $am$, coil 961, wires $an$, $h$ and $i$ to the negative side of the battery 20 and the magnet 94 will be deenergized.

When the relays 11, 12 and 13 are all deenergized, the magnet 71 will also be deenergized. The light 128 will then glow through a circuit from the positive side of the battery 20 to the wires $a$ and $o$, armature 10, contact 29, wire $ar$, contact 45, armature 18, wire $n$, armature 9, contact 27, wire $y$, light 128, wires $z$, $h$ and $i$ to the negative side of the battery 20, and the magnet 94 will be energized through a circuit from the positive side of the battery 20 to the wires $a$ and $o$, armature 10, contact 29, wire $ar$, contact 45, armature 18, wire $n$, armature 9, contact 27, wires $y$ and $ag$, magnet coil 94, wires $ak$, $an$, $h$ and $i$ to the negative side of the battery 20, and the magnet 95 will also be energized by means of its coil 951 through a circuit from the positive side of the battery 20 to the wires $a$, $ah$ and $ai$, contact 123, contact member 121, contact 122, wire $al$, coil 951, wires $aj$, $an$, $h$ and $i$ to the negative side of the battery 20; and the magnet 96 will also be energized by means of its coil 961 through a circuit from the positive side of the battery 20 to the wires $a$ and $ah$, contact 116, contact member 114, contact 115, wire $am$, coil 961, wires $an$, $h$ and $i$ to the negative side of the battery 20.

When the points 90 and 92 are in contact, a circuit is established from the positive side of the battery 20 to the wires $a$, $ah$ and $aq$, contact 90, contact 92, wire $ap$, coil 75, wires $ao$, $an$, $h$ and $i$ to the negative side of the battery 20. So that when the contacts 90 and 92 are forced apart the coil 75 will be deenergized and the air brake will be applied.

The operation of this device is as follows: With a green light glowing the magnet 71 is always energized, and the worm 79 is therefore out of mesh with its gear 80, and the permissible speed control cam 47 is maintained in its maximum position, allowing the train to proceed at maximum speed.

With the light 125 glowing, the magnet 71 is deenergized, and the worm 79 drops into mesh with its gear 80. The magnets 94, 95 and 96 are all deenergized, and therefore, their corresponding clutches 119—120, 112—113 and 103—104 are all in mesh. Therefore, the gears 97 98 are driving the shaft 84 as the couplings between the gears 111 and 118 and the shaft 84 are slipping and the permissible speed controlling cam is brought from its maximum position to its minimum position in the shortest distance R.

When the light 126 is glowing the magnet 71 is also deenergized, and the worm 79 is dropped into mesh with its gear 80. The magnets 94 and 95 are deenergized, and their corresponding clutches 119—120 and 112—113 are therefore in mesh, but the magnet 96 is energized and its corresponding clutch 103—104 is out of mesh, therefore the gears 110 and 111 are driving the shaft 84 as the coupling between the gear 48 and the shaft is slipping, and the cam 47 will be brought from its maximum to its minimum position in the distance S.

When the light 127 is glowing the magnet 71 is deenergized and the worm 79 is dropped into mesh with its gear 80. The magnet 94 is deenergized and its corresponding clutch 119—120 is therefore in mesh. The magnets 95 and 96 are energized, and their clutches 112—113 and 103—104 are out of mesh. Therefore the gears 117 and 118 are driving the shaft 84 and the cam 47 will be brought from its maximum position to its minimum position in the distance T.

When the light 128 is glowing the magnet 71 is deenergized and the worm 79 drops into mesh with its gear 80. The magnets 94, 95 and 96 are all energized, and their corresponding clutches 119—120, 112—113 and 103—104 will all be out of mesh, and the gears 130, 131 will therefore be driving the shaft 84. The cam 47 will, therefore, be brought from its maximum position to its minimum position in the distance U.

The practical operation of this device is clearly brought out by the diagram of Figure 1. It will be noted that each block of the trackway contains a home and distant main signal rail 21, together with different combinations of auxiliary signal rails 22 and 23. In every case the home and distant main signal rails 21 and the distant auxiliary signal rails 22 and 23 are controlled by the the well known continuous track circuit. The combination of rails used is decided by the braking distance desired, which in turn is decided by permanent conditions in the rear of the home signal rail.

If, for example, it requires the distance U to bring a train from the maximum speed to the minimum speed at the home signal rail at the entrance to block B, we will place the two sets of rails 21, 22 and 23 distance U apart. It will be seen by reference to the foregoing description that if these three rails are energized, that is, if there is no train in the block ahead, the train will be permitted to proceed at the maximum speed. If however, the three rails are deenergized, the train will be forced to reduce its speed from maximum to minimum in the distance between the distant rails and the home rails, which distance is the distance U.

If it requires the distance S to bring the train from the maximum speed to the minimum speed at the home signal rail at the entrance to block C, we will place the two sets of rails 21 and 22 S distance apart. It will be seen by reference to the foregoing description that if these two rails are energized, that is, if there is no train in the block ahead, the train will be permitted to proceed at the maximum speed. If, however, these two rails are deenergized, the train will be forced to reduce its speed from maximum to minimum in the distance between the distant rails and the home rails, which distance is the distance S. It will be observed that in passing the home rails at the entrance to block B, the auxiliary home signal rails 22 and 23 are permanently energized, and therefore in entering any block and after passing the home rails irrespective of the condition of the block, the signal relays 12 and 13 are always energized so that the correct combination is obtained upon reaching the next distant rails.

If it requires the distance R to bring a train from the maximum speed to the minimum speed at the home signal rail at the entrance to block D, we will place a distant signal rail 21 a distance R from the corresponding home signal rail 21. It will be seen by reference to the foregoing description that if this signal rail is energized, that is, if there is no train in the block ahead, the train will be permitted to proceed at the maximum speed. If, however, the rail is deenergized, the train will be forced to reduce its speed from maximum to minimum in the distance between the distant rail and the home rail, which is the distance R.

If it requires the distance T to bring a train from the maximum speed to the minimum speed at the home signal rail at the entrance to block E, we will place rails 21 and 23 T distances apart. It will be seen by reference to the foregoing description that if these two rails are energized, that is, if there is no train in the block ahead, the train will be permitted to proceed at the maximum speed. If, however, the two rails are deenergized, the train will be forced to reduce its speed from the maximum to minimum in the distance between the distant rails and the home rails, which is the distance T.

The use of variable braking distances is desirable principally in connection with permanent hazards existing along the trackway, for instance those due to heavy grades. It is obvious that if a train of a certain weight and speed requires a distance of three thousand feet within which to come to a stop when running at sixty miles per hour on a level, it will require a longer distance to come to a stop on a down grade and a shorter distance on an up grade. In the lower part of Figure 1 this situation is illustrated graphically. The vertical distances or ordinates represent rates of speed in miles per hour. The horizontal distances or abscissæ represent spaces traversed by the train, and a superimposed grade line shows various grades with corresponding proper braking distances.

It is of great practical advantage to so arrange a highway control of the kind described that when a danger signal is received by the engineer, his indicated permissible speed thereafter should correspond in some measure to the grades or other influencing track conditions, and as the apparatus described is all automatic and quite simple in its operation its use not only conduces to safe running but relieves the engineer of some measure of responsibility and anxiety.

I claim:—

1. The combination with a railway divided into blocks, each equipped with signal rails and a source of electrical energy therefor, of an apparatus carried by a vehicle moving along the railway and adapted automatically to control its speed, comprising a permissible speed device for the vehicle, means for moving it from a maximum to a minimum speed position at varying rates of speed corresponding to varying safe braking distances, at different points along the trackway, and an electric automatic control of said permissible speed device through the signal rails.

2. The combination with a railway divided into blocks, of a safety apparatus adapted for the automatic control of the speed of a vehicle moving along the railway and carried by the vehicle, and comprising a permissible speed device for the vehicle, means for moving it from a maximum to a minimum position at varying rates of speed corresponding during each movement to a safe braking distance for the vehicle at the particular place along the trackway at which it is moved and a highway control for such permissible speed device including signal rails in series arranged in pairs at each block, the members of each pair being placed at distances apart corresponding to a safe braking distance for the train in such block having regard to the grade or other permanent hazards of the trackway at that point.

3. A safety apparatus for the control of the speed of a vehicle moving along a trackway comprising a control consisting of a series of signal rails arranged in pairs at intervals along the trackway, the distances of the respective members of the several pairs from each other corresponding to a safe braking space for the vehicle over such distances according to the nature of the permanent hazards along the trackway at such point.

4. A safety apparatus for the control of the speed of a vehicle moving along a trackway, comprising a control therefor including a series of signal rails arranged in pairs at block intervals along the trackway, the distances of the members of each pair from each other corresponding to a safe braking distance for the vehicle over such portion of the trackway and which safe braking distance is determined by the nature of the permanent hazards along the track at such points, the distances between the pairs of rails at different points being different.

5. In an apparatus of the character described, means carried on a vehicle for determining a permissible speed therefor, means for moving the same from a maximum to a minimum speed position at varying rates of speed, in combination with means for selectively actuating one of several of its component members from a control along a trackway on which the vehicle is moving.

6. In an apparatus of the character described, means carried on a vehicle moving along a trackway for determining the permissible speed therefor, means for moving the same from a maximum to a minimum speed position at varying rates of speed and which includes several component members, and means for selectively actuating one of said component members from a control along the trackway whereby the distance travelled by the vehicle while the permissible speed determining means is moving from a maximum to a minimum position corresponds to a safe braking distance for the vehicle while covering that distance.

7. In an apparatus of the character described, the combination with a device carried on a vehicle adapted to determine a varying permissible speed therefor, of a second device for moving the same from a maximum to a minimum position at different rates of speed, and means whereby the proper rate of speed is automatically selected including signal rails arranged at intervals along the trackway in pairs, the distance between any particular pair at any particular place corresponding to a safe braking distance for the vehicle at that particular place.

8. A safety apparatus for the control of the speed of a vehicle moving along a trackway, comprising a device on the vehicle moved from the running gear thereof in accordance with its actual speed, a second device also on the vehicle moved intermittently from the running gear of the vehicle in accordance with a permissible speed, means for automatically retarding the vehicle whenever the actual speed equals or exceeds the permissible speed, in combination with a power transmitting mechanism for moving the permissible speed device from the actual speed device, and means for automatically controlling the movement of such mechanism, whereby the permissible speed device when actuated is moved at more than two rates of speed each rate of speed corresponding to a safe braking distance for such vehicle at the place along the trackway at which such actuation takes place.

9. A safety apparatus of the kind described, comprising a permissible speed device on a vehicle, and an actual speed device, a power transmitting mechanism whereby the permissible speed device is moved from the actual speed device and which includes means for varying the rate of speed of moving the permissible speed device, in combination with means for automatically controlling the power transmitting mechanism whereby there is automatically selected a rate of speed for the permissible speed device corresponding to the nature of the hazards along the trackway, such controlling means comprising electrically actuated devices along the trackway and electrically actuated devices for throwing into engagement portions of the power transmitting mechanism.

10. An apparatus for the control of moving vehicles, comprising a device on the vehicle moved from its running gear in accordance with its actual speed, a second device on the vehicle also moved from the running gear of the vehicle in accordance with the permissible speed, and means for automatically retarding the vehicle whenever the actual speed equals or exceeds the permissible speed, in combination with a power transmitting mechanism for moving the permissible speed device from the actual speed device including a driving shaft moved from the actual speed device, a driven shaft moving the permissible speed device, a series of gears on each shaft in constant mesh, and means for automatically coupling any driving gear to its shaft whereby the permissible speed device is moved from a maximum to a minimum position at a rate of speed corresponding to a safe braking distance for the vehicle while such movement of the permissible speed device is taking place.

11. In a device of the character described, a vehicle, a speed device moved from its running gear, a permissible speed device moved from the first speed device by an intermediate power transmitting mechanism including a driving shaft, a driven shaft, a series of gears on each shaft in constant mesh, and means for automatically coupling any driving gear to its shaft consisting of a clutch, an armature lever for moving the same, a relay which when energized moves the armature lever and selective means for automatically energizing the relay arranged along the trackway along which the vehicle is moving.

12. In an apparatus of the kind described, a device moving in accordance with the actual speed of a vehicle, a power transmitting mechanism moved therefrom, a permissible speed device moved from the power transmitting mechanism and which includes a driving shaft and a driven shaft, a series of gears on each shaft in constant mesh, and means for automatically coupling any driving gear to its shaft consisting of a clutch, an armature lever for moving the same, a relay which when energized moves the armature lever and selective means for energizing the relay consisting of signal rails arranged along the track in pairs at suitable intervals.

13. In an apparatus of the kind described, a device moving in accordance with the actual speed of a vehicle, another device moving in accordance with its permissible speed, and an intermediate power transmitting mechanism consisting of a driving shaft, a driven shaft, a series of gears on each shaft arranged in constant mesh in pairs and means for automatically coupling any driving gear to its shaft consisting of a clutch for each pair of gears, an armature lever for moving each clutch, relays one for each armature lever and means for energizing a particular relay or relays whereby the proper gear is coupled to the driven shaft to move the permissible speed indicator at the proper rate of speed from a maximum to a minimum position while the vehicle is covering a safe braking distance along a trackway.

14. In an apparatus of the kind described, a device moved from a vehicle in accordance with its actual speed, another device moved from the first device by a power transmitting mechanism and which second device is adapted to determine a permissible speed for the vehicle, the intermediate power transmitting mechanism comprising a driving shaft, a driven shaft, a series of gears on each shaft arranged in constant mesh in pairs, and means for automatically coupling any driving gear to its shaft consisting of a clutch for each pair of gears, an armature lever for moving each clutch, relays one for each armature lever, in combination with means for energizing a particular relay or relays whereby the proper gear is coupled to the driven shaft to move the permissible speed device at the proper rate of speed from a maximum to a minimum position while the vehicle is covering a safe braking distance along a trackway, and which energizing means include a series of signal rails arranged along the trackway at predetermined intervals.

15. In apparatus of the character set forth, the combination with a vehicle, of a movable permissive speed device, and means for moving the permissive speed device at more than two different rates of speed with respect to the speed of the vehicle.

16. In apparatus of the character set forth, the combination with a vehicle, of a movable permissive speed device thereon, and means driven by a moving part of the vehicle for moving the permissive speed device at more than two different rates of speed with respect to the speed of the vehicle.

17. In apparatus of the character set forth, the combination with a vehicle, of a movable permissive speed device, more than two different combinations of driving gearing for moving the permissive speed device, and means for selecting said combinations to operate the permissive speed device in accordance with hazards of different characters.

18. In apparatus of the character set forth, the combination with a vehicle, of a movable permissive speed device, means for moving the permissive speed device at more than two different rates of speed with respect to the speed of the vehicle, and trackside mechanism for determining the rate of speed of the permissive speed device with respect to the movement of the vehicle according to the different hazards along the line of travel of the vehicle.

19. In apparatus of the character set forth, the combination with a vehicle, of a permissive speed device movably mounted thereon, a driving member operating with the vehicle, a driven member connected to the permissive speed device, a plurality including more than two sets of transmitting gearing of different ratios between the driving and driven members, and means for selectively causing any of the sets of gearing to transmit movement from the driving member to the driven member.

20. In apparatus of the character set forth, the combination with a vehicle, of a permissive speed device movably mounted thereon, a driving member operating with the vehicle, a driven member connected to the permissive speed device, a plurality including more than two sets of transmitting gearing of different ratios between the driving and driven members, and means including trackside mechanism for automatically and selectively causing any of the sets of gearing to transmit movement from the driving member to the driven member according to the different hazards along the line of travel of the vehicle.

21. In apparatus of the character set forth, the combination with a vehicle, of a movable permissive speed device, means for moving the permissive speed device at more than two different rates of speed with respect to the speed of the vehicle, and means for indicating the rate of speed at which the permissive speed device is operated.

22. In apparatus of the character set forth, the combination with a vehicle, of a permissive speed device movably mounted thereon, a driving member operating with the vehicle, a driven member connected to the permissive speed device, a plurality including more than two sets of transmitting gearing of different ratios between the driving and driven members, means including trackside mechanism for automatically and selectively causing any of the sets of gearing to transmit movement from the driving member to the driven member according to the different hazards along the line of travel of the vehicle, and means controlled by said selecting means for indicating the speed selected thereby.

23. In combination, a track, a car thereon, a member on the car which moves in accordance with the permissive speed on the car, means dependent for movement on the movement of the car for moving such member from a maximum speed position toward a minimum speed position, a safety appliance for excessive speed adapted to be actuated by said member, and means controlled by apparatus outside the car for adjusting the rate of movement of said member so that it will move at more than two speeds and for restoring it to a maximum speed position while the car is at different places along the track.

24. In combination, a track, a car thereon, a safety appliance for excessive speed, a plurality of more than two trains of mechanism any one of them being adapted to be connected operatively from the car wheel to said appliance, and means on the track to effect such a connection of a particular one of said trains of mechanism.

25. In combination, a track, a car thereon, a safety appliance for excessive speed, a movable member carried by the car, a plurality of more than two different alternative connections from said member to actuate said appliance, and means associated with the track selectively to establish a particular connection in accordance with track conditions.

26. In combination, a track, a car thereon, a safety appliance for excessive speed on the car, apparatus to actuate said appliance, said apparatus comprising a gear train driven from the car wheel, and means to change the gear ratio of said gear train so that more than two ratios may be obtained.

27. In combination, a track, a car thereon, a safety appliance for excessive speed on the car, a plurality of alternative gear trains more than two driven from the car wheel adapted to actuate said appliance subject to a corresponding interval of delay, means selectively to establish one of said trains, and means partly on the car and partly on the track for connecting such selected gear train to actuate said appliance or for disconnecting it.

28. In combination, a track, a car thereon, a safety appliance for excessive speed on the car, apparatus driven from the car wheel to actuate said appliance subject to more than two intervals of delay, said apparatus being capable of adjustment to vary such intervals, and means partly on the car and partly on the track to effect such adjustment and to establish or disestablish an operative connection between the car wheel and the said appliance through said apparatus.

29. In combination, a track, a car thereon, a safety appliance for excessive speed on the car, apparatus to actuate said appliance, said apparatus comprising a gear train driven from the car wheel, means to change the gear ratio of said gear train so as to obtain more than two ratios, a cab indicator, and means to change said indicator to correspond with the change of said gear train.

30. In combination, a track, a car thereon, a safety appliance for excessive speed on the car apparatus to actuate said appliance, said apparatus comprising a gear train driven from the car wheel, means to change the gear ratio of said gear train so as to obtain more than two ratios, a cab signal circuit, and means to control said circuit by said means.

31. In combination, a track, a car thereon, a safety appliance for excessive speed on said car, a gear train driven from the car wheel, change gear mechanism including more than two changes to give alternative resultant gear ratios to the train, a member to actuate said appliance subject to an interval of delay, and means to connect the last gear of the train to drive said member.

32. In apparatus of the character set forth, the combination with a vehicle, of a movable permissive speed device, and means for moving the permissive speed device at different rates of speed with respect to the speed of the vehicle by gear trains constantly in mesh.

33. In apparatus of the character set forth, the combination with a vehicle, of a movable permissive speed device thereon, and means driven by a moving part of the vehicle for moving the permissive speed device at different rates of speed with respect to the speed of the vehicle by gear trains constantly in mesh.

34. In apparatus of the character set forth, the combination with a vehicle, of a movable permissive speed device, different combinations of driving gearing constantly in mesh for moving the permissive speed device, and means for selecting said combinations to operate the permissive speed device in accordance with hazards of different characters.

35. In apparatus of the character set forth, the combination with a vehicle, of a movable permissive speed device, means including gearing constantly in mesh for moving the permissive speed device at different rates of speed with respect to the speed of the vehicle, and means for indicating the rate of speed at which the permissive speed device is operated.

36. In combination, a track, a car thereon, a safety appliance for excessive speed on the car, apparatus to actuate said appliance, said apparatus comprising a gear train driven from the car wheel, means including gears constantly in mesh to change the gear ratio of said gear train, a cab signal circuit, and means to control said circuit by said means.

In testimony whereof I affix my signature.

PAUL JOHN SIMMEN.